United States Patent [19]
Marshek et al.

[11] Patent Number: 4,841,783
[45] Date of Patent: Jun. 27, 1989

[54] FLAT BELT TEST MACHINE

[76] Inventors: Kurt M. Marshek, 9701 Courtleigh Cir., Austin, Tex. 78759; Hyunsoo Kim, Kangdong-ku, Shinchon-don 7, Jangmi Apt. 19-505, Seoul, Rep. of Korea

[21] Appl. No.: 63,980

[22] Filed: Jun. 19, 1987

[51] Int. Cl.$^4$ .............................................. G01L 5/10
[52] U.S. Cl. .............................. 73/862.48; 73/862.54
[58] Field of Search ........... 73/862.04, 862.54, 862.48, 73/9, 862

[56] References Cited

U.S. PATENT DOCUMENTS

| | | | |
|---|---|---|---|
| 3,956,929 | 5/1976 | Jenkins, III et al. | 73/862 |
| 4,281,539 | 8/1981 | Keller | 73/862.54 |
| 4,546,656 | 10/1985 | Grundy et al. | 73/862.48 |
| 4,573,362 | 3/1986 | Amlani | 73/862.04 |
| 4,581,947 | 4/1986 | Wulf et al. | 73/862.48 |

OTHER PUBLICATIONS

Evans, T. J., "Apparatus for Measurement of Belt Friction", Bulletin Mechanical Engineering Education, Pergamon Press, 1968, vol. 7, p. 305.

*Primary Examiner*—Stewart J. Levy
*Assistant Examiner*—Robert P. Bell

[57] ABSTRACT

A machine is presented for measuring normal and tangential belt forces versus angular position for a flat belt drive. A normal force transducer which is designed like a curved beam and the tangential force transducer which is designed like a cantilever with head are used as contact pulleys. The transducer pulley is used as either a driving pulley or a driven pulley. Each pulley is mounted on a carriage plate which slides with linear bearings. Means are provided for applying a predetermined belt initial tension through the sliding carriage plate and means are also provided for applying torque load through a torque disk.

15 Claims, 5 Drawing Sheets

4,841,783

FLAT BELT TEST MACHINE

BACKGROUND OF THE INVENTION

This invention relates to new and useful improvements in machines for measuring the belt forces and the maximum torque load capacity in the power transmission drive of the flat belt, and the like.

Flat belts are used wherein motion or power is transmitted from one pulley to another. Power transmission capacity depends on the torque load transmitted and the belt speed. The amount of torque load transmitted is proportional to the summation of friction forces between the belt and pulley. The friction force between the belt and pulley depends on the normal pressure and a coefficient of friction.

The coefficient of friction for the flat belt drive is normally obtained from a belt-pulley experiment and Euler's formula. In applying Euler's formula, the experiment data for tight side belt tension, slack side belt tension and the arc of contact are required. In this kind of experiment, the change in belt forces versus angular position along the contact arc cannot be included. The coefficient of friction obtained from these experimental data is constant. However, in reality, the coefficient of friction varies depending on normal pressure and the rate of slip.

Measuring the distribution of normal and tangential belt forces versus angular position in the arc of contact can give a more accurate coefficient of friction as a function of belt normal pressure because belt force distribution is directly related with friction characteristics; i.e., coefficient of friction. The accurate friction characteristics obtained can be used to determine the optimal belt tension and to improve the power transmission efficiency.

The present invention is directed to new force transducers and apparatus for measuring the normal and tangential belt forces versus angular position in the arc of contact for the flat belt drive.

SUMMARY OF THE INVENTION

The present invention relates to an apparatus for measuring the normal and tangential belt forces versus angular position for a flat belt drive.

In a specific embodiment, the inventive apparatus comprises two force transducer disks, which can be used as either a driving or driven pulley. The normal force transducer which is designed like a curved beam is machined to have the same radius of curvature with contacted pulley. The curved beam of the normal force transducer has a slot at the middle point to prevent a buckling effect. The tangential force transducer which also functions like a cantilever has the same radius of curvature with the contact pulley. Both transducer disks have the same surface finish as the contact pulley. Each transducer disk can be used as either a driving or a driven pulley. The driving pulley is rotated manually by means of using a gear reducer. Each pulley is mounted on a carriage plate which slides transversely on rails. Initial belt tension is applied to the belt via a deadweight.

The inventive device includes a torque disk, through which is applied a constant torque load. The torque disk converts a given deadweight force via a cable to a torque load. A variety of torque loads can be obtained simply by adding or subtracting deadweights. A potentiometer is connected to the end of the driving or driven pulley shaft to determine the angular position of the pulley.

The further version of the invention utilizes a variable speed motor to rotate the driving pulley. Instrumentation is provided to display, record, and store the normal and tangential belt forces, and angular position for the belt drive.

It is accordingly an objective of the present invention to provide a new method and apparatus for determining the normal and tangential belt forces in the flat belt drive and the like.

BACKGROUND OF THE INVENTION

DETAILED DESCRIPTION OF THE DRAWINGS

Figure 1:
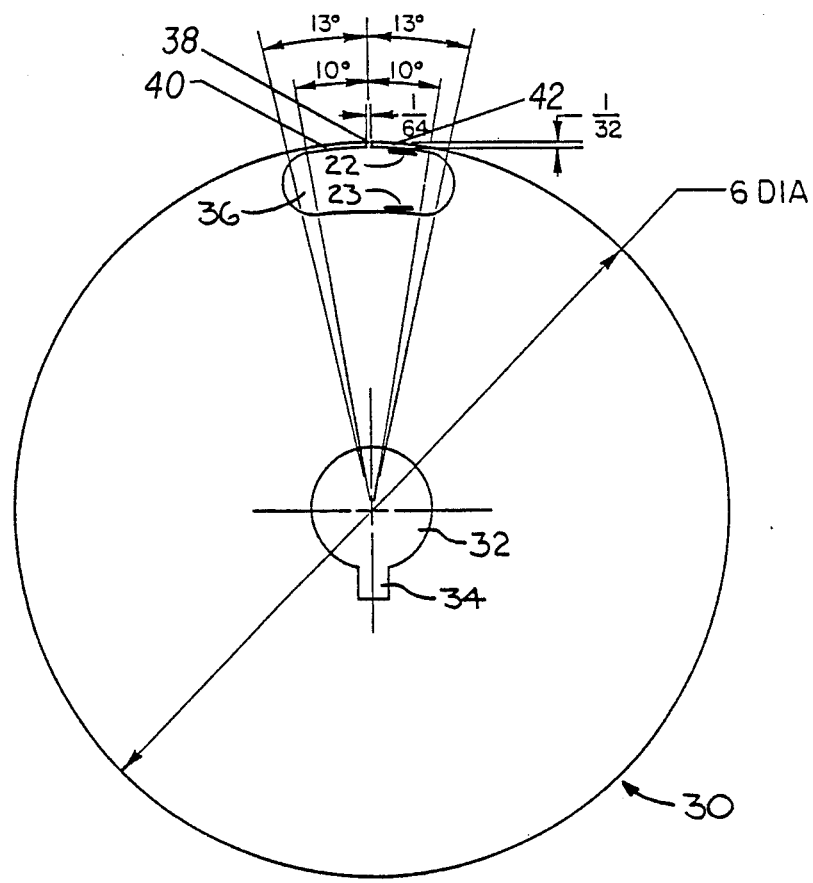
FIG. 1 is a drawing of the normal force transducer pulley.
Figure 2:
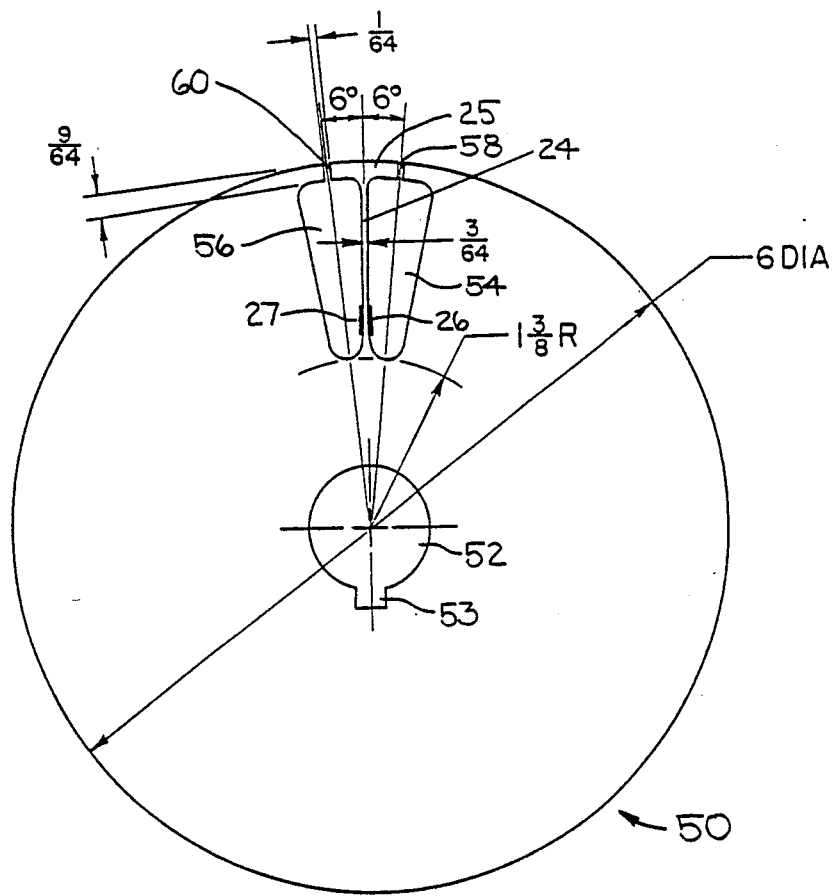
FIG. 2 is a drawing of the tangential force transducer pulley.

With reference to FIG. 1 and 2, the normal and tangential force transducers will be described.

FIG. 1 shows a normal force transducer pulley 30. The pulley 30 has a hole 32 in the pulley center. A keyway 34 is cut at the edge of the hole 32. A fat oblong slot 36 is cut near the perimeter of the pulley 30. A slit 38 which extends radially from the oblong slot to the exterior of the pulley is cut perpendicular to the length of the oblong slot 36. The geometry of the slit 38 and the oblong slot 36 help define two curved beams 40, 42. The curved beams 40, 42 deflect radially inward toward the center of the pulley when under normal (radial) load and can therefore be used to measure normal force. The curved beams have the same outside radius of curvature and the same surface characteristics as the outermost surface of the pulley 30. Also the outermost surface of the normal force transducer pulley 30 may be changed by coating the surface such as with rubber or by finishing with a machining process. This would change the frictional characteristics of the outermost surface of pulley 30. Two foil type strain gauges 22 are attached beneath one of the curved beams 42. Another two strain gauges 23 are attached to the surface formed by the oblong slot 36, on the side closest to the hole 32, to allow a half bridge circuit. It should be mentioned that curved beams 40, 42, and oblong slot 36 and associated nearby structure can be "copied" and "pasted" at other angular positions around the circumference of the normal force transducer pulley 30 to create multiple sets of curved beams 40, 42 and oblong slot 36, each set of curved beams 40, 42 capable of measuring normal force at its angular position.

FIG. 2 shows a tangential force transducer pulley 50. The pulley 50 has a hole 52 in the pulley center. A key way 53 is cut at the edge of the hole 52. Two symmetric triangular like slots 54, 56 are cut alongside one another and with their short sides near the perimeter of the pulley 50. Slits 58, 60 which extends radially from each of the triangular like slots 54, 56 are cut radially from the triangular like slots 54, 56 to the exterior of the pulley 50. The closest outside edges of the triangular like slots 54, 56 and the two slits 58, 60 define a cantilever beam 24, with a head 25. The tangential force transducer head 25 is fabricated to have the same outside radius of curvature and the same surface characteristics as the outermost surface of the pulley 50. Also the outermost surface of the tangential force transducer pulley 50 may be changed by coating the surface such as with rubber or by finishing with a machining process. At the middle point of the transducer head 25, the 3/64 inch thick cantilever beam 24 is connected. Two sets of two strain gauges 26 and 27 are attached on opposite sides of the beam 24 and form a full-bridge. The tangential component of the belt force on the transducer head 25 of the tangential force transducer pulley 50 is measured via the strain gauges 26 and 27. It should be mentioned that the cantilever beam 24 with head 25 and associated nearby structure can be "copied" and "pasted" at other angular positions around the circumference of the tangential force transducer pulley 50 to create multiple sets of cantilever beam 24 with head 25, each beam 24 capable of measuring tangential force at its angular position. It should also be clear that the curved beams 40, 42 and oblong slot 36 of FIG. 1 can be "copied" and "pasted" at angular positions around the circumference of the tangential force transducer pulley 50 to create multiple sets of curved beams 40, 42 and oblong slot 36 interspersed with multiple sets of cantilever beam 24 and head 25 to form a pulley capable of measuring normal force and tangential force respectively where curved beams 40, 42 and cantilever beam 24 are positioned.

Figure 3:
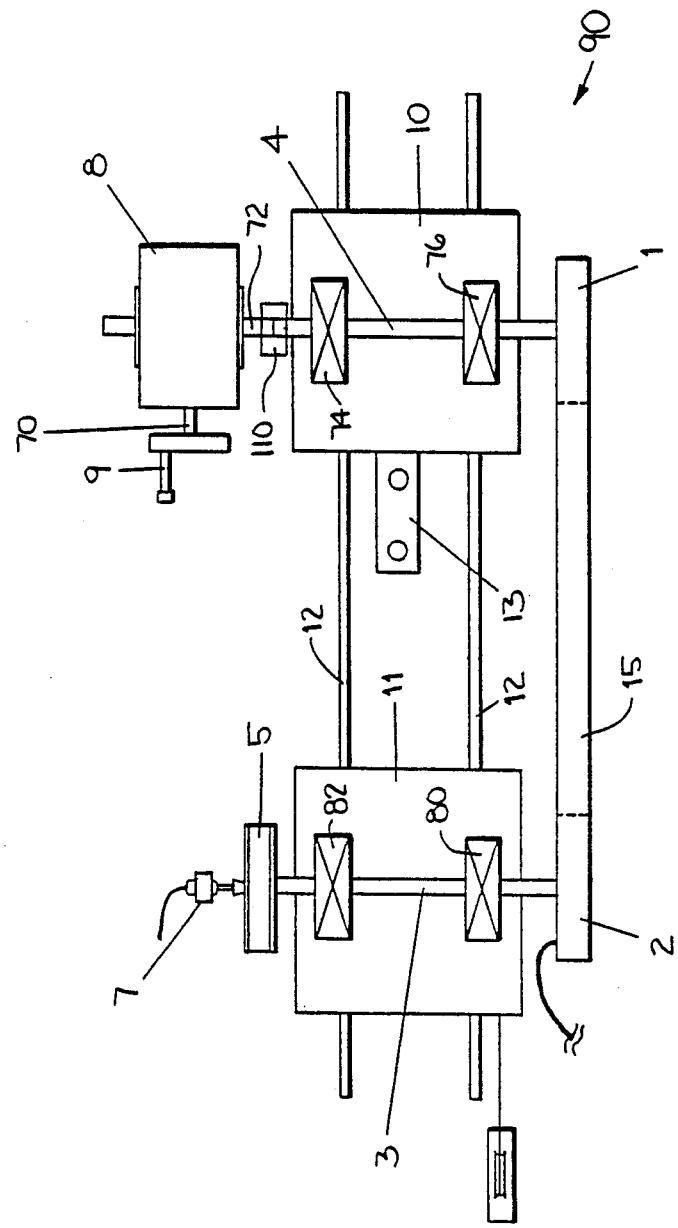
FIG. 3 is a top view of an assembly drawing of the flat belt test machine.
Figure 4:
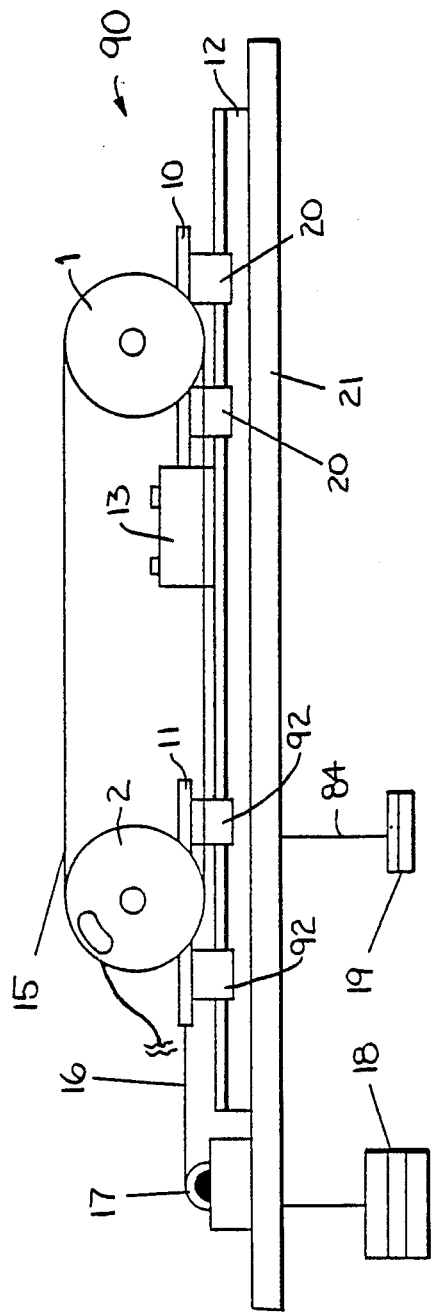
FIG. 4 is a side view of an assembly drawing of the flat belt test machine.

FIG. 3 and 4 show top and side views of an assembly drawing of a flat belt test machine 90. Power is supplied by rotating a crank hand wheel 9 attached to the input shaft 70 of a 30:1 gear reducer 8. The output shaft 72 of the gear reducer 8 is attached by means of coupling 110 to one end of shaft 4. Alternatively a variable speed D.C. or A.C. motor can replace gear reducer 8 and be used to supply power to coupling 110. Rotation of crank handwheel 9 causes rotation of the driving pulley 1 which is connected to the gear reducer 8 through shaft 4. Shaft 4 is supported by two pillow block bearings 74 and 76. On the opposite end of shaft 4 is mounted the driver pulley 1. A belt 15 connects the driving pulley 1 to driven pulley 2. Rotation of the driving pulley 1 causes the driven pulley 2 to be turned by the test belt 15. Driven pulley 2 is mounted on one end of shaft 3. The one inch diameter steel shaft 3 is supported by two pillow block bearings 80 and 82. On the opposite end of shaft 3 is attached a torque disk 5. A cord 84 is attached to and wrapped around torque disk 5 and hangs vertically. Attached at the vertically hanging end of cord 84 are deadweights 19. Alternatively the torque disk 5, cord 84 and deadweight 19 can be replaced by a gear pump or the like whose output shaft would attach to shaft 3. The gear pump or the like would act with appropriate support to supply a torsional resistance to oppose rotation of shaft 3.

A torque load is applied through the torque disk 5. The torque disk 5 converts a given deadweight 19 into a torque. A variety of torque loads can be obtained simply by adding or subtracting deadweights 19. The normal and tangential force transducer pulleys 30 and 50 in FIG. 1 and FIG. 2 respectively can be used as either a driving pulley 1 or a driven pulley 2. It should be pointed out that normal transducer pulleys 30 can be used as driving pulley 1 and as driven pulley 2 or tangential force transducer pulleys 50 can be used as driving pulley 1 and as driven pulley 2, or any combination of normal and tangential force transducer pulleys 30 and 50 (even those with multiple sets of curved beams 40, 42 and oblong slot 36 and multiple sets of cantilever beam 24 with head 25) can be used as driving pulley 1 and as driven pulley 2.

In FIG. 3, the electrical connection from the driving pulley 1 or the driven pulley 2 (the trasnducer pulleys 30 and 50) is a flexible wire which can twist as the pulley rotates. Alternatively, the electrical connection can be effected with other modifications.

Pillow block bearings 74 and 76 are mounted on transverse sliding plate 10 which is attached to linear bearings 20. The linear bearings 20 run on two ⅜ inch diameter stainless steel rails 12. The two rails are attached to the top of the table 21. A stopping block 13 is attached to the top of the table 21 to prevent the transverse sliding plate 10 from moving to the left. Pillow block bearings 80 and 82 are mounted on transverse sliding plate 11 which is attached to linear bearings 92. The linear bearings 92 run on the two ⅜ inch diameter stainless steel rails 12.

A cord 16 is attached at one end of the transverse sliding plate 11. The cord 16 passes over roller 17. Deadweights 18 are attached to the vertical end of cord 16. Initial belt tension is applied to the belt 15 with deadweight 18. The force from the deadweight 18 is transmitted through cord 16 directly to the transverse sliding plate 11. Since the transverse sliding plate 10 is constrained by stopping block 13, a tension is produced in the belt 15.

A ten turn potentiometer 7 is connected to the end of the driven pulley shaft 3 nearest the torque disk 5 for measurement of the driven pulley angular displacement. Alternatively the potentiometer 7 can be connected to the end of the driving pulley shaft 4 for measuring the driving pulley angular displacement. Also potentiometers or shaft encoders could be used attached to both shaft 3 and shaft 4 to measure absolute or relative angular displacement of driving and driven pulleys.

Figure 5:
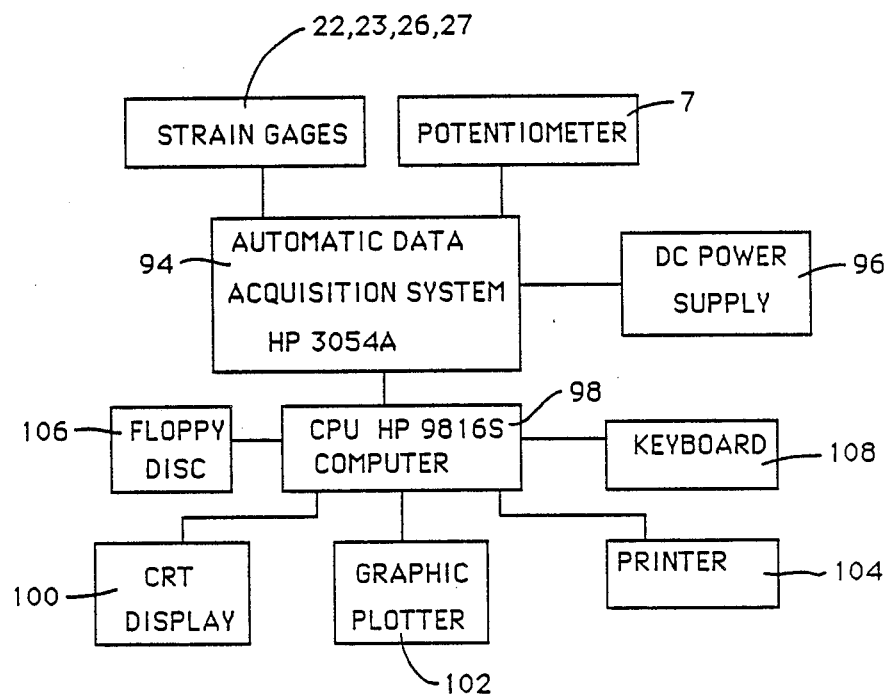
FIG. 5 is a block diagram of the data acquisition and measurement system.

FIG. 5 shows a schematic drawing of the data measurement and acquisition system arrangement for the test machine. Output from the potentiometer 7 as well as the strain gauges 22, 23, 26, 27 are transmitted to the automatic data acquisition system 94. That is, the automatic data acquisition system 94, receives input from regulating the input voltage to the potentiometer 7 and the strain gauges 22, 23, 26, 27. The automatic data acquisition system 94 also receives input via a D.C. power supply 96. Output from the automatic data acquisition system 94 is sent to the main computer CPU 98. The keyboard 108 is attached to the main computer CPU 98. The main computer CPU 98 converts output voltage signals to forces and angular position. Output data for forces versus angular position are displayed on the computer CRT display screen 100 which is connected to the computer 98. Output can also be plotted and recorded using a graphic plotter 102 and printer 104 also connected to computer 98. A floppy disc 106, also connected to the computer 98 stores data for re-use and evaluation.

Above, a specific embodiment of the present invention has been described. It should be appreciated, however that this embodiment was described for purposes of illustration only, without any intention of limiting the scope of the present invention. As will be apparent to those skilled in the art, many modifications may be made to the invention without departing from the spirit and scope thereof. Accordingly the invention is not limited to the exact form and arrangement in the embodiment disclosed. The normal and tangential force transducer pulleys could be made as one pulley. The handwheel gear reducer power input system could be replaced by a variable speed motor. The potentiometer can alternatively be connected to the driving pulley shaft for measurement of the driving pulley angular displacement. Shaft encoders could replace the potentiometers. Therefore, it is the intention that the present invention be limited not by the above but only as is defined by the appended claims.

What is claimed is:

1. An apparatus for measuring normal and tangential belt forces versus angular position for drive of flat belt, abrasive belt and the like, the apparatus comprising:
   a normal force transducer driving pulley with two curved beams for measuring normal force each beam located at or near the pulley outermost surface and each beam having a radius of curvature and a surface characteristic similar to that of the outermost surface of the pulley;
   a tangential force transducer driven pulley with a cantilever beam for measuring tangenlial force and having a head located at or near the pulley outermost surface with a radius of curvature and a surface characteristic similar to that of the outer most surface of the pulley;
   a torque disk connected to said driven pulley;
   first and second transverse sliding plates (which slide on rails) on which respectively said driving and driven pulleys each are separately mounted;
   input power supply means connected to the driving pulley to supply input power to the driving pulley;
   means for applying belt initial tension through said second transverse sliding plate, by applying tension to a first cord operatively connected to said second transverse sliding plate and wound at least partially on a roller.

2. The apparatus of claim 1 wherein the driven pulley is a normal force transducer and the driving pulley is a tangential force transducer.

3. The apparatus of claim 1 wherein both driving and driven pulleys have normal force transducers.

4. The apparatus recited in claim 1 wherein tangential force transducer pulley has a cantilever beam with a head having the same cross-sectional shape as the cantilever beam; and beam extends to outer peripherial edge of pulley and beam end acts as transducer head.

5. The apparatus recited in claim 1 wherein more than one pulley with curved beams are used; i.e., both driving and driven pulleys have normal force transducers.

6. The apparatus of claim 1 wherein both driving and driven pulleys have tangential force transducers.

7. The apparatus recited in claim 1 wherein said normal and tangential force transducer pulleys are built together as one pulley.

8. The apparatus recited in claim 1 wherein more than one set of transducer pulley with normal and tangential transducer are used; i.e., both driving and driven pulleys have normal and tangential force transducers.

9. The apparatus recited in claim 1 wherein normal and/or tangential transducer pulley contact wheel surface finish are changed by means of coating such as with rubber or by machining.

10. The apparatus recited in claim 1 wherein said means for supplying input power to a driving pulley is a hand wheel-gear reducer power input system or a variable speed D.C. or A.C. motor.

11. The apparatus recited in claim 1 wherein said means for applying belt tension using said second transverse sliding plate is a cord attached from the sliding plate to a deadweight.

12. The apparatus recited in claim 1 wherein said means for determining the pulley angular position of at least one of the pulley shafts is a potentiometer or a shaft encoder.

13. The apparatus recited in claim 1 wherein said means for determining the pulley angular position of at least one of the pulley shafts is a potentiometer or a shaft encoder to measure absolute or relative angular displacement of driving and driven pulleys.

14. The apparatus recited in claim 1 wherein driving and driven pulleys each mounted on separate transverse sliding plates which slide on rails via linear bearings.

15. The apparatus recited in claim 1 wherein said torque disk is replaced with a load application means such as a gear pump or the like.

* * * * *